United States Patent
Makisaka et al.

(10) Patent No.: US 7,356,825 B2
(45) Date of Patent: Apr. 8, 2008

(54) DISK CARRYING APPARATUS

(75) Inventors: Yukinari Makisaka, Tokorozawa (JP); Hitoshi Ueno, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 428 days.

(21) Appl. No.: 10/948,208

(22) Filed: Sep. 24, 2004

(65) Prior Publication Data
US 2005/0086674 A1   Apr. 21, 2005

(30) Foreign Application Priority Data
Oct. 20, 2003  (JP)  ............................. 2003-360056

(51) Int. Cl.
*G11B 17/04*   (2006.01)
(52) U.S. Cl. .................. 720/626; 720/307; 720/619; 720/623; 720/628; 720/634; 720/645; 720/704; 369/264; 369/30.36; 369/53.12
(58) Field of Classification Search ............... 720/626, 720/619, 645, 604, 622, 631, 632, 634, 721, 720/723, 724
See application file for complete search history.

(56) References Cited

U.S. PATENT DOCUMENTS

| | | | | |
|---|---|---|---|---|
| 4,497,051 A | * | 1/1985 | Takahashi et al. | .......... 720/619 |
| 5,144,612 A | * | 9/1992 | Isobe et al. | .................. 720/607 |
| 5,150,349 A | * | 9/1992 | Takai et al. | .................. 720/626 |
| 6,288,982 B1 | * | 9/2001 | Kato | ....................... 369/30.36 |
| 6,324,154 B1 | * | 11/2001 | Kakuta et al. | ............... 369/264 |
| 6,587,412 B1 | * | 7/2003 | Matsuo et al. | ........... 369/53.12 |
| 6,839,898 B2 | * | 1/2005 | Saji et al. | .................... 720/619 |
| 6,963,519 B2 | * | 11/2005 | Otsuki et al. | ............ 369/30.36 |

FOREIGN PATENT DOCUMENTS

| | | | |
|---|---|---|---|
| DE | 19731319 A1 | * | 5/1998 |
| JP | 2003-16710 | | 1/2003 |

* cited by examiner

*Primary Examiner*—Andrea Wellington
*Assistant Examiner*—Carlos E Garcia
(74) *Attorney, Agent, or Firm*—Nixon & Vanderhye P.C.

(57) ABSTRACT

The disk carrying apparatus includes a lifting portion which carries a disk onto a turntable, a chuck which holds the carried disk on the turntable, and a third switch which detects an intermediate position between a holding operation start position where the chuck starts a disk holding operation and a holding operation end position where the chuck finishes the disk holding operation. After completion of an initial disk holding operation, the chuck returns to the intermediate position detected by the third switch and retries the disk holding operation.

8 Claims, 10 Drawing Sheets

FIG. 1

(SWITCH A:on B:on C:on)

FIG. 2

(SWITCH A:off B:on C:on)

REAR ↕ FRONT

LEFT ⟷ RIGHT

FIG. 3

(SWITCH A:off B:on C:on)

FIG. 4

(SWITCH A:off B:off C:off)

FIG. 5

(SWITCH A:on B:off C:off)

FIG. 8B  A:off B:on C:on (FIG.2)

→ FORWARD TRAVEL

FIG. 8C  A:off B:on C:on (FIG.3)

→ FORWARD TRAVEL

FIG. 8D  A:off B:off C:off (FIG.4)

FIG. 8E  A:off B:off C:off (FIG. 4)

BACKWARD TRAVEL ←

FIG. 8F  A:off B:on C:on

BACKWARD TRAVEL ←

FIG. 8G  A:off B:off C:on

→ FORWARD TRAVEL

FIG. 8H  A:off B:off C:off (FIG. 4)

FIG. 8I  A:off B:off C:on

BACKWARD TRAVEL ←

FIG. 8J  A:off B:on C:on

BACKWARD TRAVEL ←

FIG. 8K  A:off B:on C:on (FIG. 2)

BACKWARD TRAVEL ←

FIG. 8L  A:on B:off C:off (FIG. 5)

BACKWARD TRAVEL ←

DISK CARRYING APPARATUS

BACKGROUND OF THE INVENTION

1. Field of the Invention

The present invention relates to a disk carrying apparatus for carrying a disk such as a CD (Compact Disk) or a DVD (Digital Versatile Disk).

2. Description of the Related Art

Japanese Patent Application Laid-Open Publication No. 2003-16710 discloses an example of the related arts. A disk recording/reproducing system loads a disk to a recording/reproduction position by a built-in disk carrying apparatus and, after recording/reproduction, ejects the disk to the outside of the system.

The disk carrying apparatus detects insertion of a disk into a casing by a sensor switch or the like, loads the disk onto a turntable by a driving mechanism, and holds the disk on the turntable by a holding portion. When completion of the disk holding operation is detected by another sensor switch, the turntable rotates the disk, and a recording/reproducing portion records/reproduces predetermined information to/from the rotating disk. After completion of recording/reproduction, the disk carrying apparatus ejects the disk to the outside of the system by the reverse of the above operation.

There is, however, a case that when the holding portion holds a disk on the turntable, if the disk is not carried to the predetermined position for some reason and a positional deviation occurs between the disk and the turntable, the disk may not be held reliably.

SUMMARY OF THE INVENTION

Accordingly, one example for addressing the problems of the prior art is to provide a disk carrying apparatus capable of realizing more reliable holding of a disk by re-trying a disk holding operation of the holding portion.

The present invention will be described below. Although reference numerals in the accompanying drawings will be accessorily written as parenthetic numerals for descriptive convenience, the present invention is not limited to the illustrated features.

The above object of the present invention can be achieved by a disk carrying apparatus provided with: a disk carrying mechanism, such as a lifting portion (5), which carries a disk (1) onto a turntable (2); a disk holding mechanism, such as a chuck (2a), which holds the carried disk (1) on the turntable (2); and an intermediate position detector, such as a third switch (B), which detects an intermediate position between a holding operation start position where the disk holding mechanism (2a) starts a disk holding operation and a holding operation end position where the disk holding mechanism (2a) finishes the disk holding operation. After completion of an initial disk holding operation, the disk holding mechanism (2a) returns to the intermediate position detected by the intermediate position detector (B) and retries the disk holding operation.

DETAILED DESCRIPTION OF THE PREFERRED EMBODIMENTS

The best mode for carrying out the present invention will be described hereinbelow with reference to the drawings.

Figure 1:
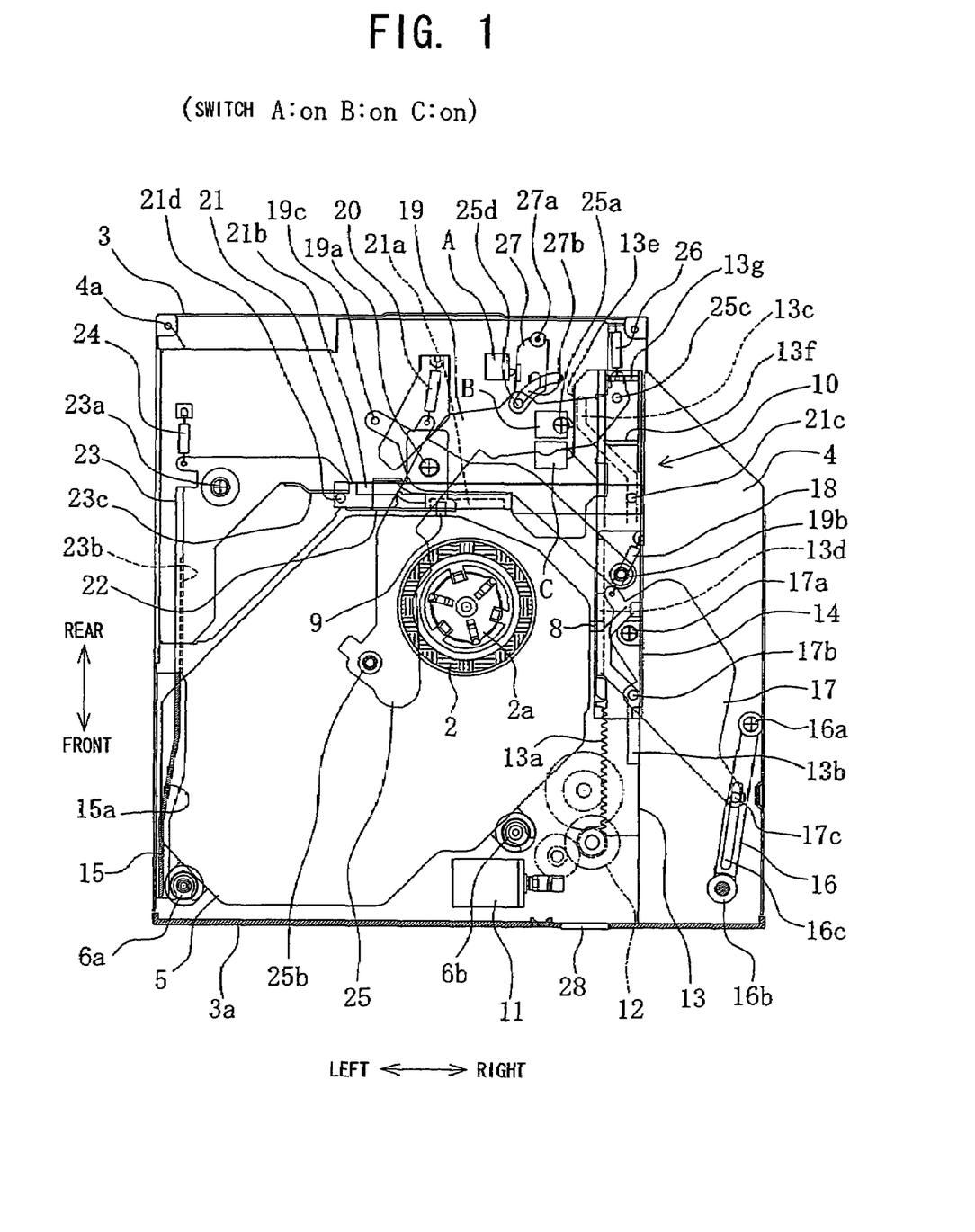
FIG. 1 is a plan view showing a disk carrying apparatus according to an embodiment of the present invention in a standby state.
Figure 2:
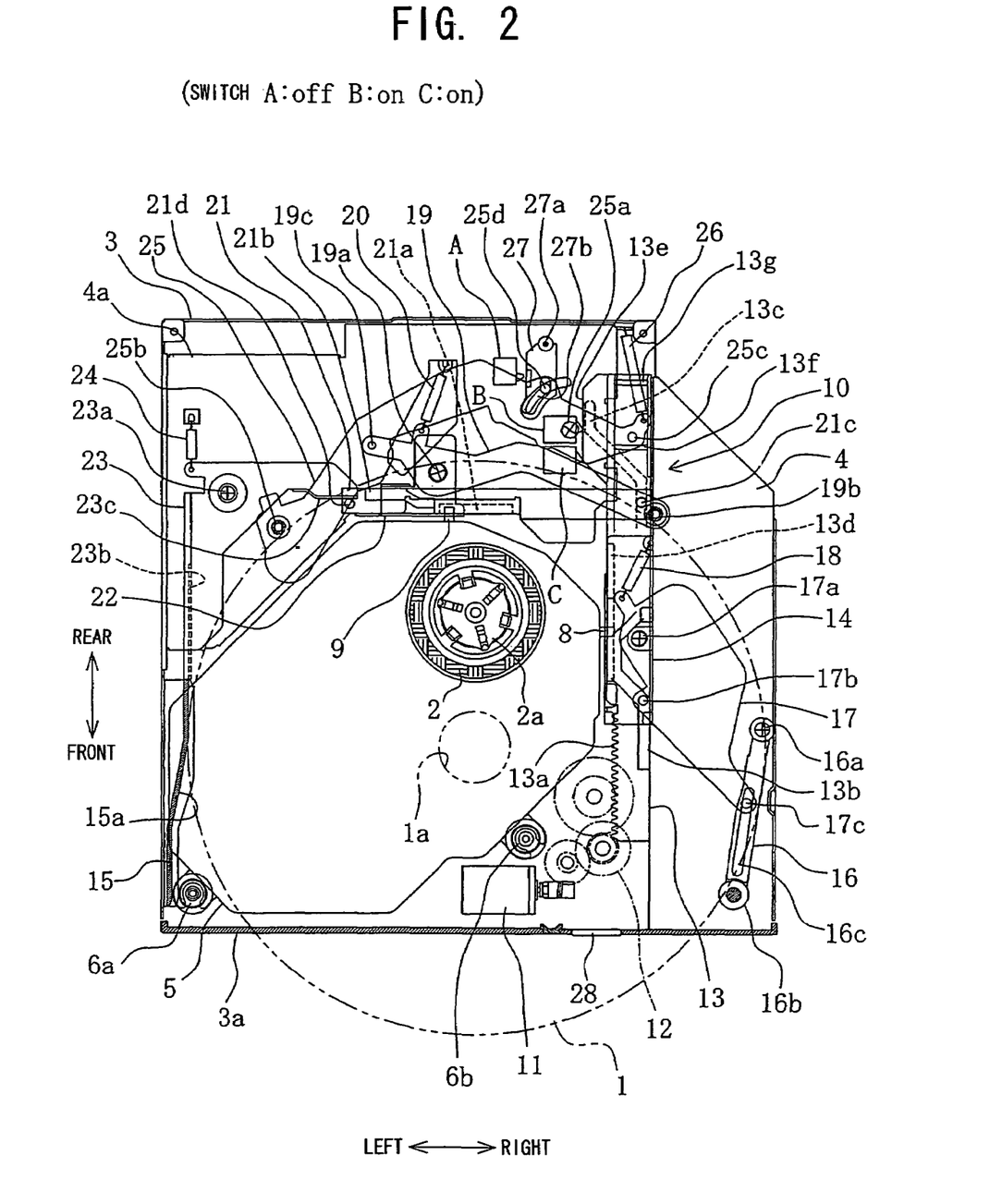
FIG. 2 is a plan view showing the disk carrying apparatus in a disk loading start state.
Figure 3:
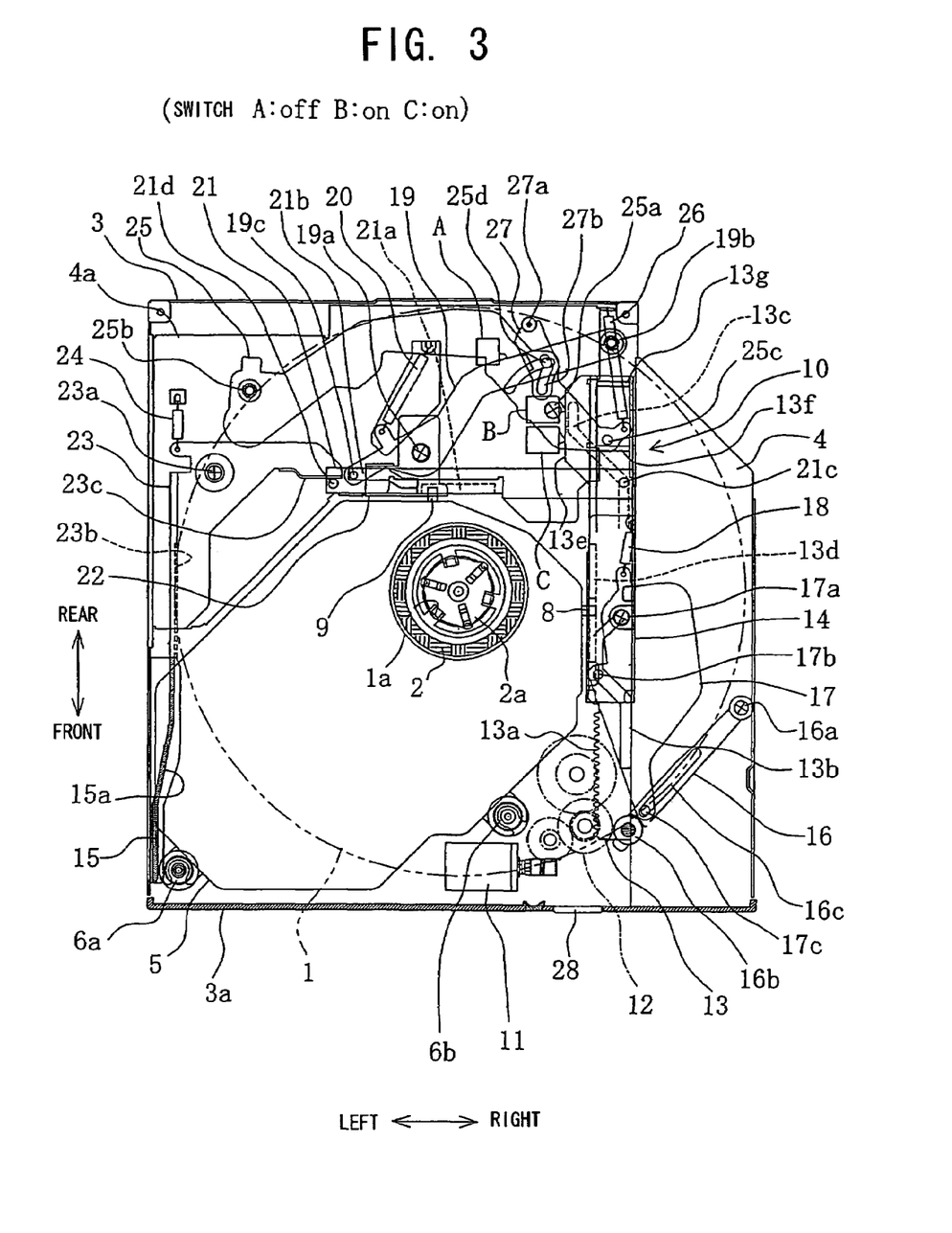
FIG. 3 is a plan view showing the disk carrying apparatus in a disk loading completion state.
Figure 4:
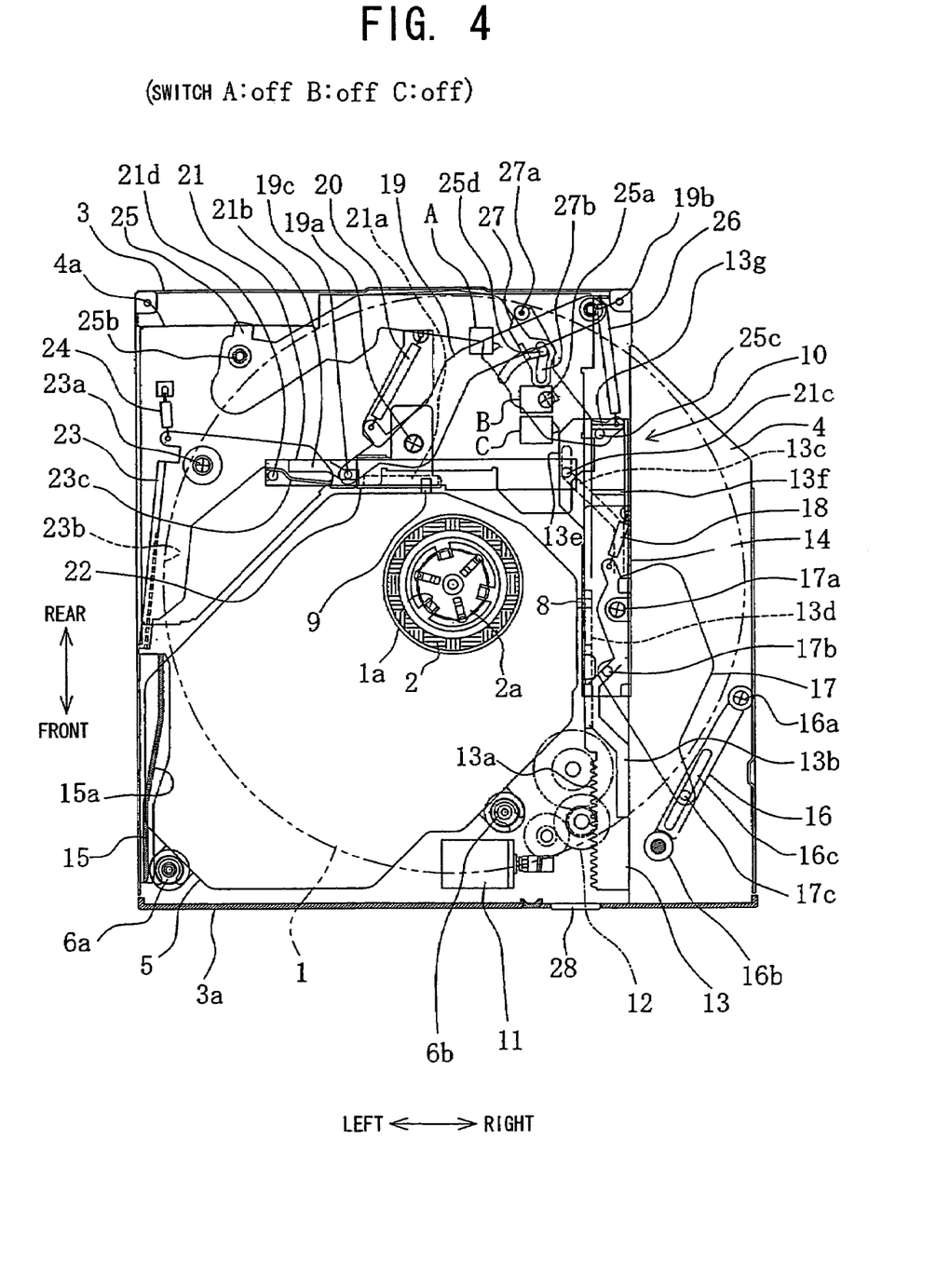
FIG. 4 is a plan view showing the disk carrying apparatus in a disk holding completion state.

A disk carrying apparatus is initially in a state shown in FIG. 1. As shown in FIGS. 2 to 4, the disk carrying apparatus loads a disk 1 onto a turntable 2 and holds the disk 1 by a holding portion of the turntable 2 as shown in FIG. 4 by a holding operation of making the disk 1 and the turntable 2 relatively close to each other.

As shown in FIGS. 1 to 4, the disk carrying apparatus is disposed in a flat box-shaped casing 3 of a disk recording/reproducing system.

Figure 6A:
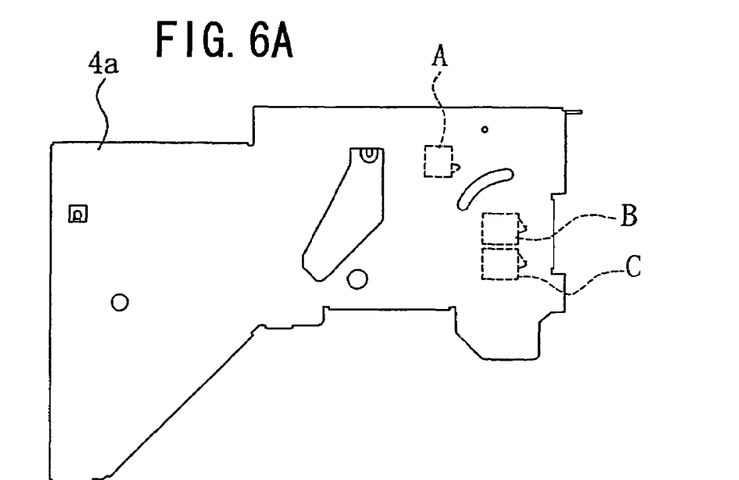
FIGS. 6A to 6D are plan views of a sub-chassis, a first holder, a second holder, and a lifting portion, respectively, used for the disk carrying apparatus.

The casing 3 has a chassis 4 in its lower portion. A sub chassis 4a shown in FIG. 6A is fixed on the chassis 4 and is provided so as to be deviated to the rear side of the casing 3. A panel 3a having an insertion slot (not shown) of the disk 1 is fixed on the front face of the casing 3.

Figures 6B, 6C, 6D:
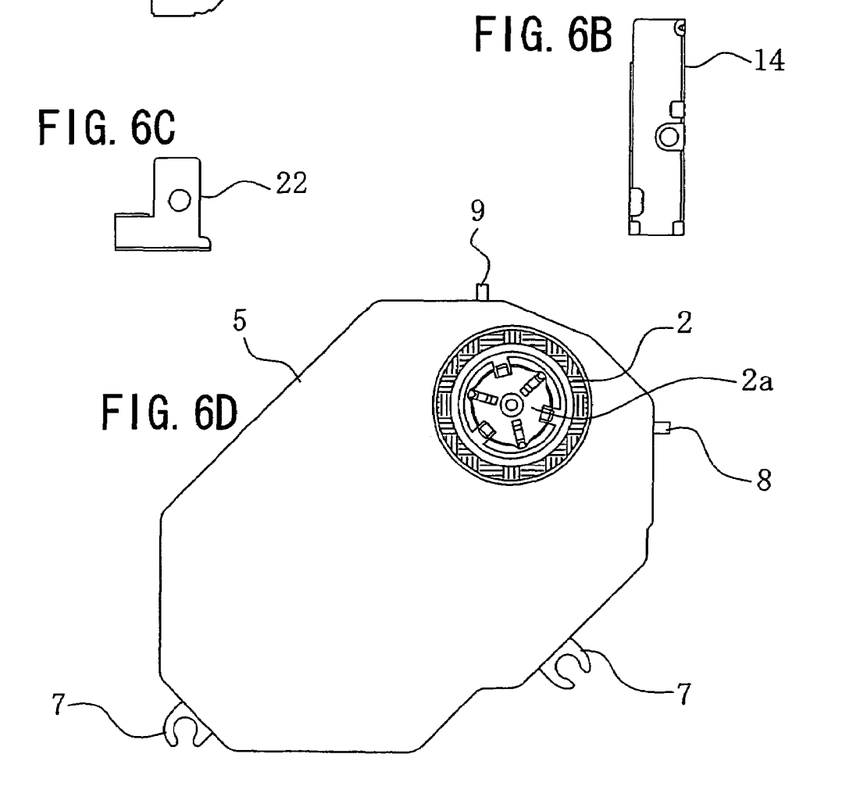

A lifting portion 5 shown in FIG. 6D is provided between the front edge of the sub chassis 4a on the chassis 4 and the panel 3a. The lifting portion 5 has, in addition to the turntable 2, a motor for rotating the turntable, an optical head, a mechanism for reciprocating the optical head, and the like (which are not shown). The lifting portion 5, the mechanism for reciprocating the optical head, and the like according to this embodiment serve as a disk carrying mechanism according to the present invention. To the center of the turntable 2, a chuck 2a having an almost cylindrical shape as a holding portion of the disk 1 is fixed. The chuck 2a according to this embodiment serves as a disk holding mechanism according to the present invention. The chuck 2a has an elastic piece which fits in a holding hole 1a in the center of the disk 1. When the disk 1 is fit in the chuck 2a, the elastic piece is displaced and press-fit in the holding hole 1a of the disk 1, and the disk 1 is held rotatably.

As shown in FIGS. 1 to 4, the lifting portion 5 is placed on the chassis 4 so that the turntable 2 is positioned in an almost center of the chassis 4, and two points on the panel 3*a* side are coupled to the chassis 4 via universal joints 6*a* and 6*b*. Each of the universal joints 6*a* and 6*b* is constructed by, for example, a shaft in a stepped screw which is screwed into the chassis 4, a fork 7 shown in FIG. 6D projected from the lifting portion 5 so as to sandwich the shaft, and a rubber bush inserted between the shaft and the fork 7. Pins 8 and 9 as cam followers are projected from the side opposite to the fulcrum of the lifting portion 5 toward the right side and the rear side of the chassis 4, respectively. The pins 8 and 9 are retained by two cams which will be described later so that the lifting portion 5 can move in the vertical direction by using the two universal joints 6*a* and 6*b* as fulcrums on the chassis 4.

As shown in FIGS. 1 to 5, the casing 3 comprises a driving mechanism 10 including a disk carrying mechanism and a disk holding mechanism which are constructed by links, cams and the like which perform loading, holding, and ejection of the disk 1 by a series of operations, a motor 11 as a drive source for supplying power to the driving mechanism 10, and a gear train 12 as a reduction gear for transmitting the power of the motor 11 to the driving mechanism 10. The driving mechanism 10 according to this embodiment serves as a driving mechanism according to the present invention.

The motor 11 is fixed on the panel 3*a* side on the chassis 4. A plurality of gears 12 are provided so that the gear on the leading side engages with the worm on the output shaft of the motor 11.

A drive mechanism 10 includes various links having various cams as shown in FIGS. 7A to 7I.

Figures 7A, 7B, 7C, 7D, 7E, 7F, 7G, 7H, 7I:
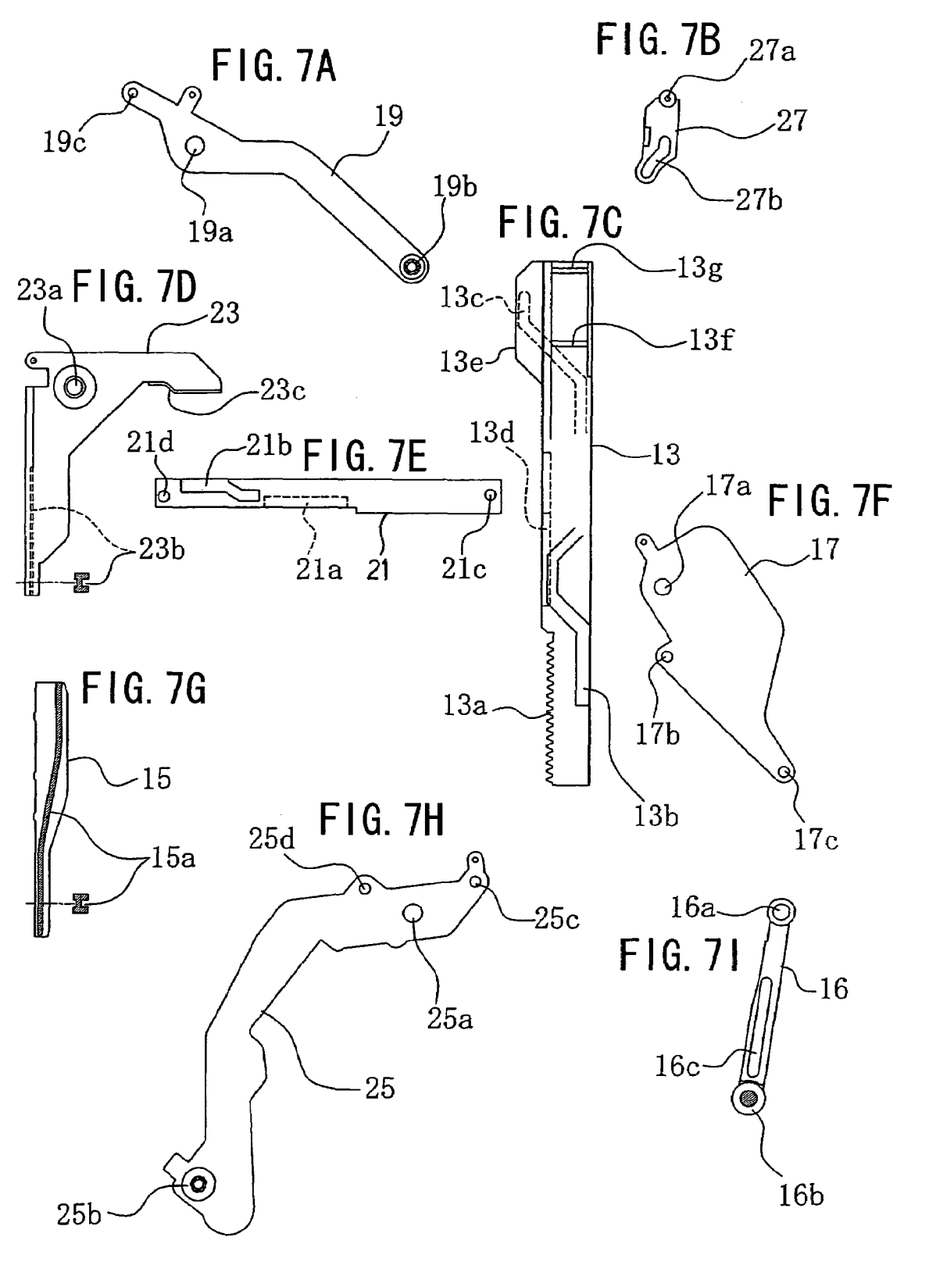
FIGS. 7A to 7I are plan views of various links which are a hold arm, a switch arm, a first slider, a centering arm, a second slider, a coupling arm, a disk guide, an eject lever, and a pull-in lever, respectively, used for the disk carrying apparatus.

A link shown in FIG. 7C is a first slider 13 having a rack 13*a* and a plurality of kinds of cams 13*b*, 13*c*, 13*d*, 13*e*, 13*f*, and 13*g* and is held on the chassis 4 via a first holder 14 shown in FIG. 6B so as to extend in the front/rear direction of the casing 3 as shown in FIGS. 1 to 5. The first slider 13 is slidable in the front/rear direction by using the first holder 14 as a guide. The teeth of the rack 13*a* formed in the first slider 13 engage with the last gear of the above plurality of gears 12. When the motor 11 rotates forward or reverse, the first slider 13 reciprocates linearly in the front/rear direction on the chassis 4. Accompanying the reciprocating motion of the first slider 13, the other various links interlockingly move and operate to load/eject the disk 1 and to hold/release the disk 1.

A link shown in FIG. 7G is a disk guide 15 and is fixed, as shown in FIGS. 1 to 5, so as to extend in the front/rear direction at the left end on the chassis 4 and in a position near to the panel 3*a*. A guide groove 15*a* having an almost U shape in cross section in which the peripheral edge of the disk 1 is fit is formed in the disk guide 15. The disk guide 15 is stationary on the chassis 4 irrespective of motion of the first slider 13 and guides loading/ejection of the disk 1.

A link shown in FIG. 7I is a pull-in lever 16 and is, as shown in FIGS. 1 to 5, axially supported by a fulcrum pin 16*a* at the right end on the chassis 4 and in a position near to the panel 3*a*. A first roller 16*b* as a contact is attached to the tip of the pull-in lever 16. In the peripheral face of the first roller 16*b*, a groove in which the peripheral edge of the disk 1 is fit is formed.

The pull-in lever 16 is coupled to the first slider 13 via a coupling arm 17 as a link shown in FIG. 7F. The coupling arm 17 is swingably supported by the first holder 14 fixed on the chassis 4 via a fulcrum pin 17*a*. The coupling arm 17 has two pins 17*b* and 17*c* as cam followers. The pin 17*b* is fit in a first cam 13*b* on the first slider 13, and the other pin 17*c* is fit in a second cam 16*c* of the pull-in lever 16. As shown in FIGS. 1 to 4, when the first slider 13 slides to the panel 3*a* side by forward rotation of the motor 11, the pull-in lever 16 swings clockwise via the coupling arm 17 by using the fulcrum pin 16*a* as a fulcrum, and the first roller 16*b* comes into contact with the peripheral edge of the disk 1 on the panel 3*a* side, thereby pushing the disk 1 into the deep side of the casing 3. The disk 1 is carried to the rear side of the casing 3 while being supported by the disk guide 15 at the left end which is opposite to the pull-in lever 16. The disk 1 is ejected to the outside of the casing 3 when the various links perform reverse operations by reverse rotation of the motor 11. As shown in FIGS. 1 to 5, the coupling arm 17 is coupled to the first holder 14 fixed on the chassis 4 by an extension spring 18. By the extension spring 18, as shown in FIGS. 2 and 3, the pull-in lever 16 is energized in the direction of pushing the disk 1 into the casing 3 by the first roller 16*b*.

A link shown in FIG. 7A is a hold arm 19 and is axially supported by a fulcrum pin 19*a* on the sub chassis 4*a* as shown in FIGS. 1 to 5. A second roller 19*b* as a contact is attached to the tip of the hold arm 19. A groove in which the peripheral edge of the disk 1 is fit is formed in the peripheral face of the second roller 19*b*. As shown in FIGS. 2 and 3, when the disk 1 is loaded in by being pressed by the first roller 16*b* and guided by the disk guide 15, the second roller 19*b* holds the peripheral edge of the disk 1 on the opposite side in the front/rear direction, of the first roller 16*b* and the disk guide 15. The hold arm 19 is always energized in the direction of pushing the second roller 19*b* against the peripheral edge of the disk 1 by an extension spring 20 suspended from the sub chassis 4*a*. A pin 19*c* as a cam follower is fixed to the rear end of the hold arm 19. As shown in FIG. 3, when the pin 19*c* comes into contact with a fourth cam 21*b* of a second slider 21 which will be described later, the hold arm 19 stops swinging and stops loading of the disk 1.

A link shown in FIG. 7E is the second slider 21 having various cams and is, as shown in FIGS. 1 to 5, slidable in the horizontal direction on the chassis 4 while being guided by a second holder 22 shown in FIG. 6C fixed on the chassis 4. A pin 21*c* as a cam follower is fixed at the right end of the second slider 21 and is fit in a third cam 13*c* formed in the under face of the first slider 13. Consequently, the second slider 21 moves interlockingly with the motion of the first slider 13. A pin 21*d* functioning as a cam follower of the cam of a centering arm 23 which will be described later is fixed at the left end of the second slider 21.

A link shown in FIG. 7D is the centering arm 23 having an almost L shape and is axially supported by a fulcrum pin 23*a* at a position near to the left on the sub chassis 4*a* as shown in FIGS. 1 to 5. A guide groove 23*b* having a similar shape to a guide groove 15*a* is formed at an end of the centering arm 23, so as to be aligned with the guide groove 15*a* of the disk guide 15. A fifth cam 23*c* which comes into contact with the pin 21*d* fixed at the left end of the second slider 21 is provided at the other end of the centering arm 23. The centering arm 23 is always energized in the direction that the fifth cam 23*c* comes into contact with the pin 21*d* of the second slider 21 by an extension spring 24 suspended from the sub chassis 4*a*. As shown in FIGS. 1 to 3, when the fifth cam 23*c* comes into contact with the pin 21*d* and is stopped, the guide groove 23*b* of the centering arm 23 is lined-aligned with the guide groove 15*d* of the disk guide 15. As shown in FIGS. 2 and 3, when the disk 1 is pressed by the first roller 16*b*, the disk 1 slides from the guide groove 15a in the disk guide 15 into the guide groove 23b in the centering arm 23 and is centered in the casing 3 by three members of the guide groove 23b in the centering arm 23, the first roller 16b, and the second roller 19b. Specifically, the disk 1 is stopped when the holding hole 1a in the center of the disk 1 comes just over the chuck 2a. members of the centering arm 23, first roller 16b, and second roller 19b have to be detached from the peripheral edge of the disk 1 so that the rotation of the disk 1 is not disturbed.

The operation of detaching the first roller 16b is performed by the first cam 13b of the first slider 13 as shown in FIG. 4. When the first slider 13 travels forward to the most advanced position shown in FIG. 4, the coupling arm 17 and the pull-in lever 16 move interlockingly by engagement between the first and second cams 13b and 16c and the pins 17b and 17c, and the first roller 16b is slightly separated from the peripheral edge of the disk 1.

The operation of detaching the second roller 19b is performed by a fourth cam 21b formed in the second slider 21 as shown in FIG. 4. As shown in FIG. 3, in a state where the second roller 19b is in contact with the peripheral edge of the centered disk 1, the pin 19c as a cam follower on the hold arm 19 enters the hole in the fourth cam 21b. As shown in FIG. 4, when the first slider 13 travels forward to the most advanced position, the second slider 21 slides to the left by the action of the third cam 13c, the pin 19c enters the fourth cam 21b, therefore, the hold arm 19 swings counterclockwise around the fulcrum pin 19a as a center, and the second roller 19b is slightly separated from the peripheral edge of the disk 1.

The operation of detaching the guide groove 23b in the centering arm 23 is performed by the fifth cam 23c formed in the centering arm 23 as shown in FIG. 4. As shown in FIG. 3, in a state where the peripheral edge of the centered disk 1 is fit in the guide groove 23b, the pin 21d at the left end of the second slider 21 is in contact with the fifth cam 23c of the centering arm 23. As shown in FIG. 4, when the first slider 13 moves forward to the most advanced position, the second slider 21 slides to the left by the action of the third cam 13c, the centering arm 23 swings in the clockwise direction around the fulcrum pin 23a as a center by a sliding action between the fifth cam 23c and the pin 21d, and the guide groove 23b is slightly separated from the peripheral edge of the disk 1.

Since the centering arm 23 guides a disk until the lifting portion 5 finishes the holding of the disk, the disk is properly centered and the disk holding operation by the lifting portion 5 can be accurately performed. The centering arm 23 is directly moved by the second slider 21 as a member for lifting the lifting portion 5, so that precision of centering becomes higher and the disk can be stably held.

A link shown in FIG. 7H is an eject lever 25 as a member for ejecting the disk 1 and is axially supported by a fulcrum pin 25a on the sub chassis 4a as shown in FIGS. 1 to 5. A third roller 25b as a contact is attached to the tip of the eject lever 25. A groove in which the peripheral edge of the disk 1 is fit is formed in the periphery of the third roller 25b. When the eject lever 25 swings around the fulcrum pin 25a as a fulcrum, the third roller 25b moves in an almost front/rear direction in the casing 3. As shown in FIGS. 2 and 3, when the disk 1 is loaded by being pressed by the first roller 16b and guided by the disk guide 15 and the centering arm 23, the third roller 25b comes into contact with the peripheral edge of the disk 1 from the opposite side in the front/rear direction of the first roller 16b, that is, from the rear side of the casing 3. The eject lever 25 is always energized in the direction of pressing the third roller 25b against the peripheral edge of the disk 1 by an extension spring 26 which is suspended from the sub chassis 4a.

As shown in FIGS. 1 to 5, the rear end of the eject lever 25 is projected to up to the first slider 13 and a pin 25c is fixed to the projected end. On the other hand, the first slider 13 is provided with contact walls of the cams 13f and 13g as projections so as to sandwich the pin 25c from both sides in the sliding direction.

Figure 5:
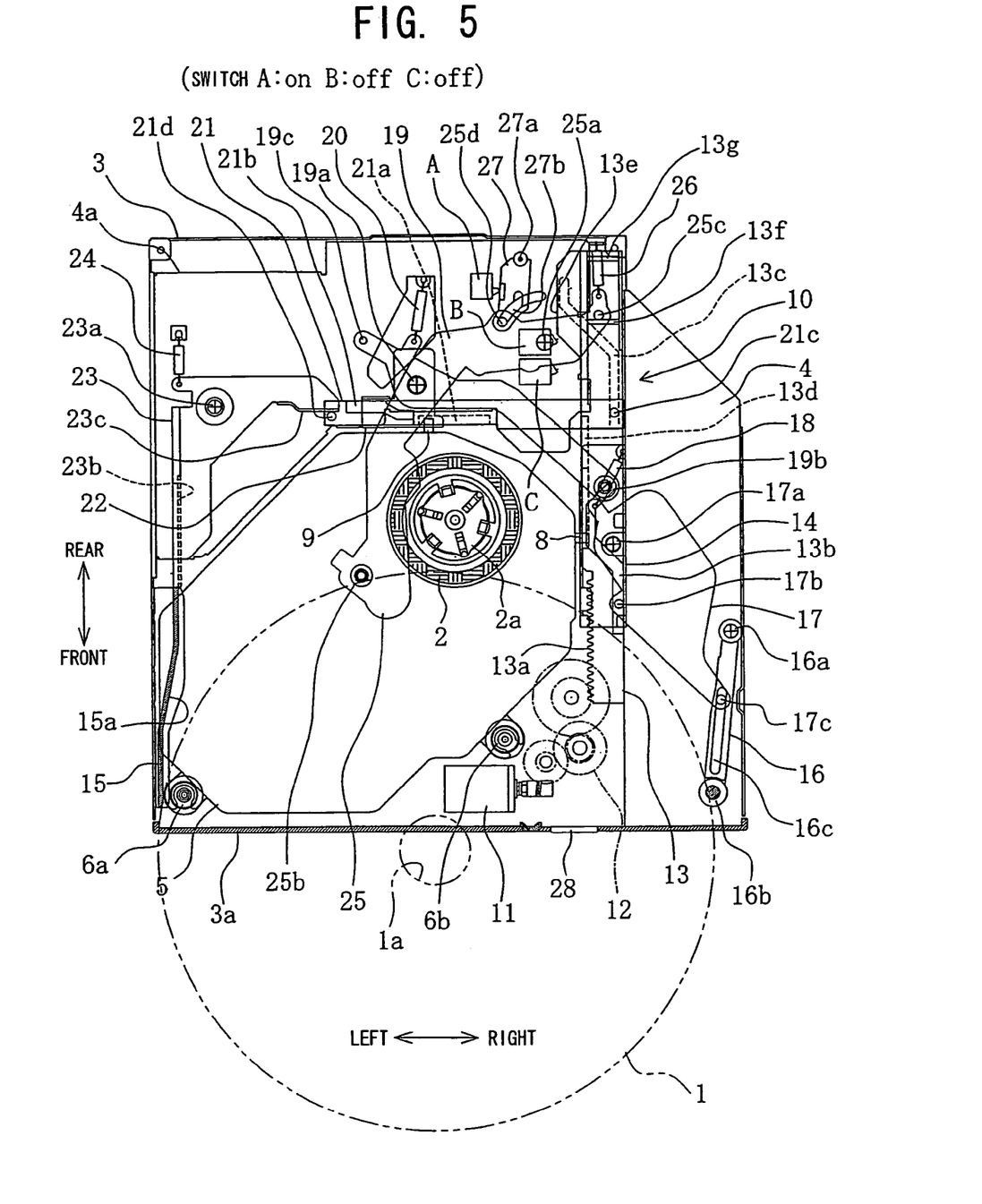
FIG. 5 is a plan view showing the disk carrying apparatus in a disk ejection completion state.

As shown in FIG. 1, when the recording/reproducing system is in the standby state, the eject lever 25 is connected to the sub chassis 4a by the extension spring 26, the pin 25c is in an idle state between the contact walls of the cams 13f and 13g, and the third roller 25b waits in the most advanced position. When the disk 1 is inserted into the casing 3 by an operator as shown in FIG. 2 and the first slider 13 moves forward as shown in FIG. 3, in a state where the third roller 25b is pressed by the peripheral edge of the disk 1 and comes into contact with the disk 1, the eject lever 25 swings in the clockwise direction by using the fulcrum pin 25a as a fulcrum. When the disk 1 is centered and held by the chuck 2a in the state shown in FIG. 3 and the first slider 13 moves forward to the most advanced position as shown in FIG. 4, the contact wall of the cam 13g on the rear side comes into contact with the pin 25c so that the eject lever 25 swings a little to make the third roller 25b detach from the peripheral edge of the disk 1. The operation of detaching the third roller 25b is performed synchronously with the operation of detaching the first and second rollers 16b and 19b and the centering arm 23. As shown in FIG. 5, at the time of ejecting the disk 1 to the outside of the casing 3, the first slider 13 moves backward and the contact wall of the cam 13f on the front side comes into contact with the pin 25c, so that the eject lever 25 swings counterclockwise by using the fulcrum pin 25a as a fulcrum. Consequently, the disk 1 is pushed by the third roller 25b and is ejected to the outside of the casing 3 while being guided by the guide grooves 23b and 15a of the centering arm 23 and the disk guide 15 and the first roller 16b. The eject lever 25 according to this embodiment serves as a releasing mechanism which performs a releasing operation of releasing the disk held on the turntable according to the present invention.

With the configuration of the eject lever 25, when the disk 1 is inserted, the eject lever 25 operates, not by being driven by the motor 11 but by being pushed by the disk 1. Consequently, it is unnecessary to obtain synchronization with the pull-in lever 16, and no rattles and the like occur due to asynchronization, so that the operation of the eject lever 25 becomes smooth and stable. After the disk 1 is held, by driving the motor 11, the eject lever 25 can be reliably detached from the peripheral edge of the disk 1. Further, the eject lever 25 can be operated by driving the motor 11 at the time of ejecting the disk, so that the disk 1 can be ejected smoothly at a stable speed.

A link shown in FIG. 7B is a switch arm 27 and is axially supported by the fulcrum pin 27a on the chassis 4 as shown in FIGS. 1 to 5. In the switch arm 27, an eighth cam 27b is formed as a cam groove, and a pin 25d fixed to the eject lever 25 is fit in the cam groove. A first switch A as unit for detecting the on/off state of the motor 11 is fixed on a circuit board so as to face the switch arm 27. As shown in FIG. 2, when the disk 1 is inserted in the casing 3 and the eject lever 25 swings via the third roller 25b, the switch arm 27 is detached from the first switch A by the action of the eighth cam 27b and the off state is obtained. Thereby, the motor 11 starts rotating forward and, by operations of the various links as stated above, the disk 1 is forcefully loaded into the casing 3 and is held by the chuck 2a. Further, an eject switch 28 is attached to the panel 3a. When the eject switch 28 is operated by the operator, the motor 11 starts reverse rotation and, by the pressing action of the upright wall of the cam 13f on the front side accompanying backward travel of the first slider 13, the eject lever 25 swings reversely, and the disk 1 is forcedly ejected to the outside of the casing 3 by the third roller 25b. In the ejecting operation, when the switch A is turned on by the switch arm 27 and switches B and C are turned on from the turn off state and are again turned on by movement of a ninth cam 13e as will be described later, the motor 11 stops reverse rotation. In short, the timing of stopping the reverse rotation is when the first slider 13 is positioned on the rear side of the disk standby position.

As shown in FIGS. 1 to 5 and FIGS. 7C and 7L, in side faces of the first and second sliders 13 and 21, the sixth and seventh cams 13d and 21a in which the pins 8 and 9 projected from the lifting portion 5 are to be fit are formed. Since the first and second sliders 13 and 21 slide symmetrically, the cams 13d and 21a appear symmetrically. Therefore, the The sixth cam 13d will be described below.

As shown in FIGS. 8A to 8D, the sixth cam 13d has a first cam groove "a" extending linearly in parallel with the chassis 4 toward the front face of the casing 3, a second cam groove "b" extending obliquely upward from the rear end of the first cam groove "a", a third cam groove "c" extending linearly rearward from the rear end of the second cam groove "b", a fourth cam groove "d" extending obliquely downward from the rear end of the third cam groove "c", and a fifth cam groove "e" extending rearward from the rear end of the fourth cam groove "d".

Figure 8A:
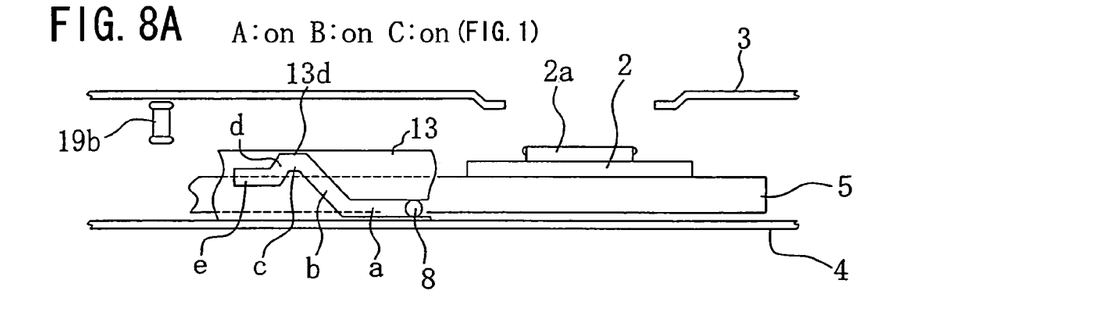
FIGS. 8A to 8D are longitudinal section views showing processes from standby and loading of a disk to holding of the disk and correspond to a disk standby state, a disk loading completion state, a disk holding operation state, and a disk holding completion state, respectively.
Figure 8B:
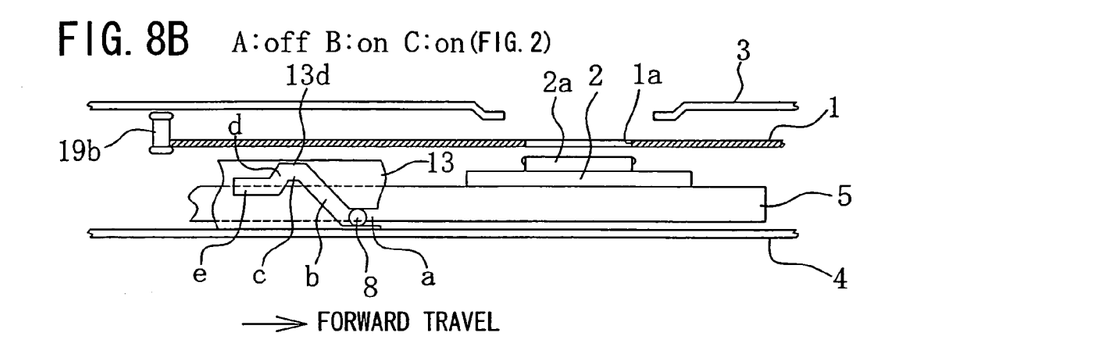
Figure 8C:
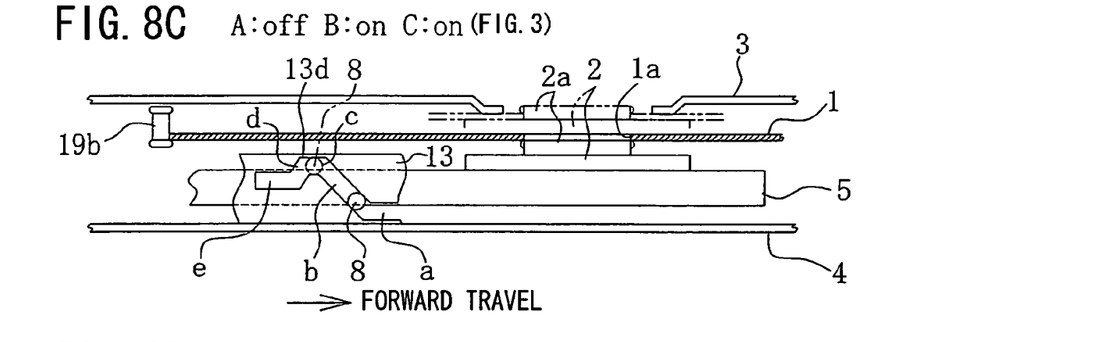
Figure 8D:
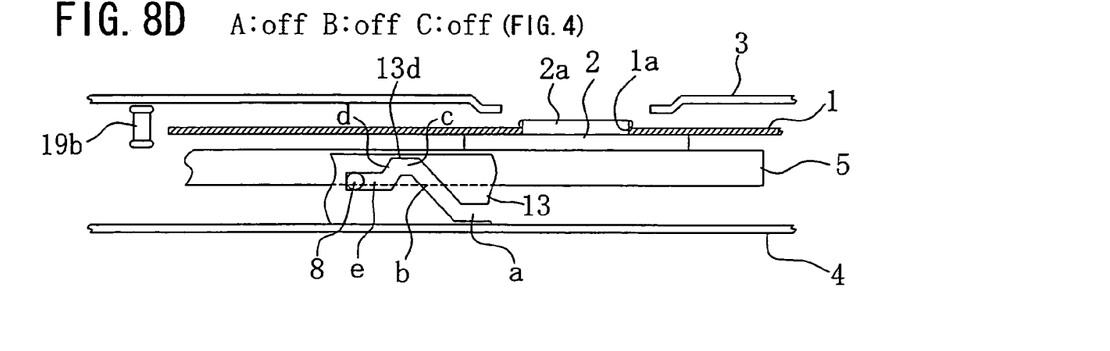
Figure 8E:
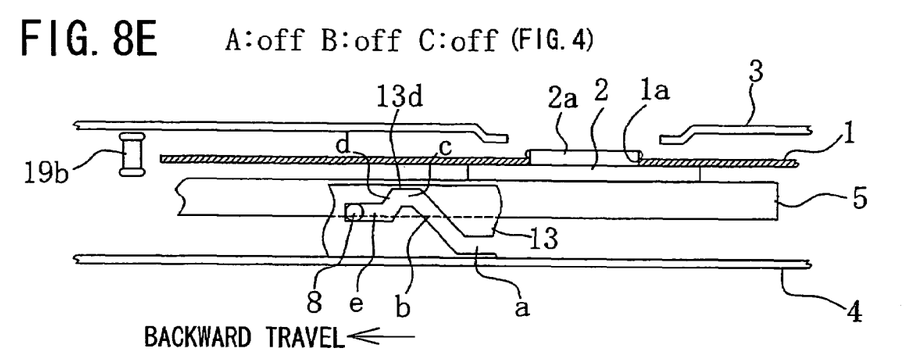
FIGS. 8E to 8H are longitudinal section views showing a disk holding re-try process and corresponding to a disk holding completion state, a state where the disk is returned to an intermediate position, a re-holding operation state, and a disk holding completion state, respectively.

As shown in FIG. 1, when the disk carrying apparatus is in the standby state, as shown in FIG. 8A, the pin 8 of the lifting portion 5 is in the first cam groove "a" and the lifting portion 5 stops in the descent position. When the first slider 13 starts forward travel as shown in FIG. 2, the pin 8 of the lifting portion 5 slides relatively in the first cam groove "a" as shown in FIG. 8B. When centering of the disk 1 is performed as shown in FIG. 3 in association with the forward travel of the first slider 13, the pin 8 moves from the first cam groove "a" to the second cam groove "b" as shown in FIG. 8C, the lifting portion 5 moves upward on the chassis 4 by using the two universal joints 6a and 6b as fulcrums, and the chuck 2a is entering the holding hole 1a in the disk 1. When the first slider 13 continues forward travel and the pin 8 enters the third cam groove "c", the lifting portion 5 rises to the highest position as shown by the alternate long and two short dashes line (chain double-dashed line) in FIG. 8C, the disk 1 comes into contact with the periphery of an opening in the top face of the casing 3, and the chuck 2a is fit in the holding hole 1a in the disk 1 to hold the disk 1. When the first slider 13 moves forward to the most advanced position as shown in FIG. 4, the pin 8 enters the fourth cam groove "d" and descends a little. After that, the pin 8 enters the fifth cam groove "e" as shown in FIG. 8D, the chuck 2a descends a little from the highest position together with the lifting portion 5 and the disk 1 moves apart from the top face of the casing 3. At the same time, as shown in FIG. 4, the first, second, and third rollers 16b, 19b, and 25b and the centering arm 23 are detached from the peripheral edge of the disk 1. In this state, a not-shown optical head of the lifting portion 5 scans the disk 1. When the disk 1 is ejected from the casing 3 to the outside, by backward slide of the first slider 13, the pin 8 slides relatively from the fifth cam groove "e" to the first cam groove "a" in order reverse to the order shown in FIGS. 8A to 8D as shown in FIGS. 8I, 8J, 8K, and 8L to make the lifting portion 5 descend and the disk 1 is released from the chuck 2a. As shown in FIG. 8J, a projection 29 for ejection is provided in a predetermined position in the casing 3, the disk 1 comes into contact with the projection 29 when the lifting portion 5 descends, and the disk 1 is detached from the chuck 2a by descending force of the lifting portion 5.

As shown in FIG. 7C, the ninth cam 13e is provided in a side face of the first slider 13. As shown in FIGS. 1 to 5, the cam face of the ninth cam 13e is formed in parallel with the sliding direction of the first slider 13. The second switch C for detecting holding completion of the disk 1 by the chuck 2a is fixed on the circuit board so as to face the cam face. When the chuck 2a is fit in the holding hole 1a in the disk 1 as shown in FIGS. 4 and 8D, the lever of the second switch C is detached from the cam face of the ninth cam 13e, the second switch C is turned off, the motor 11 stops, and the first slider 13 stops in the most advanced position.

As described above, there is a case that the disk 1 is imperfectly held by the chuck 2a in the process of FIG. 8C. To prevent this, in the disk carrying apparatus, measures for retrying the operation of holding the disk 1 by the chuck 2a are taken.

That is, by setting an intermediate position between a holding operation start position indicating the start position of the operation of holding the disk 1 by the chuck 2a shown in FIG. 8C and a holding operation end position indicating the end position of the holding operation shown in FIG. 8D, the holding operation is retried between the holding operation end position and the intermediate position. The holding operation end position and the intermediate position refer to specific positions and states of a driving mechanism including links and cams as components of the disk carrying apparatus. As shown in FIGS. 1 to 5, concretely, the intermediate position is set by mounting the third switch B as an intermediate position detector according to the present invention for detecting the intermediate position along the ninth cam 13e of the first slider 13. The first slider 13 is a displacing member which is displaced according to the present invention with the holding operation of making the disk 1 and the chuck 2a placed relatively close to each other. Therefore, the third switch B can be also operated by a member such as the first slider 13, the lifting portion 5, or the like which operates in association with the holding of the disk 1. The third switch B can be attached onto the circuit board in a manner similar to the second switch C.

Desirably, the third switch B is disposed so that the intermediate position is set between the holding operation end position of the holding operation of holding the disk 1 shown in FIG. 8D and a releasing operation start position indicating the start position of the releasing operation of releasing the disk 1 shown in FIG. 8J. The release operation start position shown in FIG. 8J is a position where the disk 1 held by the chuck 2a comes into contact with the projection 29 for ejection. By setting the intermediate position between the holding operation end position and the release operation start position, the disk 1 initially held by the chuck 2a can be prevented from coming off from the chuck 2a by the retry.

Although the third switch B can be disposed in a position apart from the second switch C as a holding operation end position detector according-to the present invention where the holding operation end position is detected, it is preferable to dispose the third switch B adjacent to the second switch C as shown in FIGS. 1 to 5. With the configuration, the timing of detecting the intermediate position in the interval between the third and second switches B and C can be adjusted more easily. By disposing the switches B and C so as to be adjacent to each other, the ninth cam 13e as a member for turning on/off the switch C can be used. Further, by turning on/off the switches B and C with the ninth cam 13e as a common member, the intermediate position can be set between the switches B and C. That is, by adjusting the distance of the switch B from the switch C, the period of retrying the disk holding operation from the disk holding completion state can be defined as a movement amount of an actual mechanism. Consequently, for example, as compared with the case of reverse-rotating the motor 11 for a predetermined time from the disk holding complete state, retry can be performed more reliably.

Figure 8F:
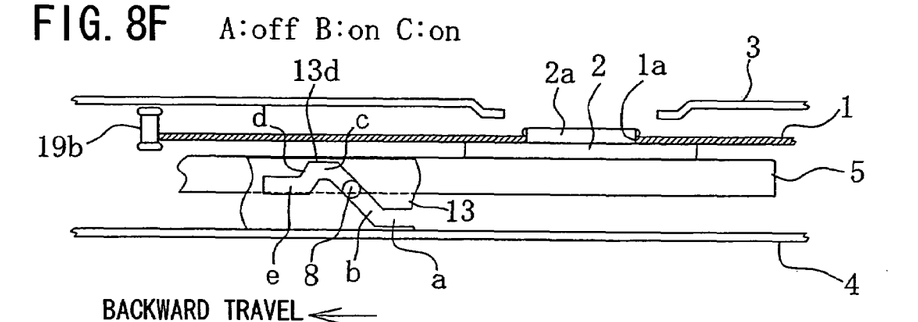

In the embodiment, the intermediate position is set in the position shown in FIG. 8F and corresponds to an intermediate state between the state shown in FIG. 3 and the state shown in FIG. 4 in the driving mechanism.

Figure 8G:
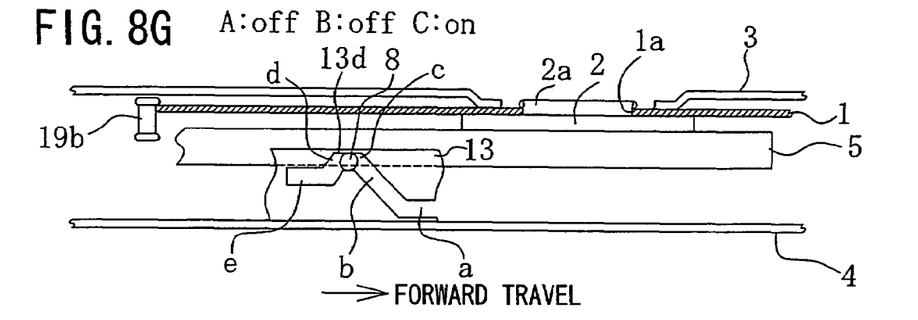

When the operation of holding the disk 1 by the chuck 2a is completed as shown in FIGS. 8A to 8D, the ninth cam 13e comes off from both of the second and third switches C and B as shown in FIG. 4. As a result, the switches C and B are turned off, the motor 11 rotates reversely so that the first slider 13 travels backward from the holding operation end position of FIG. 8E to the intermediate position of FIG. 8F, and the chuck 2a starts retrying the holding operation. When the first slider 13 travels backward and both of the second and third switches C and B are turned on as shown in FIG. 3 in the intermediate position in FIG. 8F, the motor 11 is switched to rotate forward and the first slider travels forward as shown in FIG. 8G and reaches the holding operation end position of FIG. 8H. This will enable the retry of the holding operation to finish.

The action of the disk carrying apparatus with the above configuration will now be described.

In the casing 3 of the disk recording/reproducing system, the disk carrying apparatus waits in the state shown in FIGS. 1 and 8A.

As shown in FIG. 2, when the disk 1 is inserted by the operator from a not-shown insertion slot in the panel 3a on the front face of the casing 3, the peripheral edge of the disk 1 comes into contact with the first roller 16b, the second roller 19b, and the disk guide 15 and fits in the grooves of the first roller 16b, the second roller 19b, and the disk guide 15. In such a manner, the disk 1 is supported by those three points.

Simultaneously, the peripheral edge of the disk 1 comes into contact with the third roller 25b at the tip of the eject lever 25 and the eject lever 25 pushed by the disk 1 swings in the clockwise direction around the fulcrum pin 25a against the tensile force of the extension spring 26. By the action of the pin 25d and the eighth cam 27b, the switch arm 27 swings in the counterclockwise direction around the fulcrum pin 27a as a fulcrum, and the switch lever 27 is detached from the first switch A. Consequently, the motor 11 starts forward rotation to make the first slider 13 travel forward from the position in FIGS. 2 and 8A to the position in FIG. 3.

In the process the first slider 13 travels forward to the position in FIG. 3, the coupling arm 17 swings in the clockwise direction around the fulcrum pin 17a as a center by the action of the first cam 13b and the pin 17b, the pull-in lever 16 swings clockwise around the fulcrum pin 16a as a center by the action of the second cam 16c and the pin 17c, and the first roller 16b at the tip of the pull-in lever 16 pushes the disk 1 to the rear side of the casing 3. After the disk 1 is pushed to the position in FIG. 3, transmission of power is blocked by the first cam 13b and the pin 17b, and the pull-in lever 16 stops swinging.

At the time of loading the disk 1 by the pull-in lever 16, the disk guide 15 and the centering arm 23, which are positioned on the opposite side to the first roller 16b in the lateral direction, guide the peripheral edge of the disk 1 by the guide grooves 15a and 23b, and the second roller 19b of the hold arm 19 supports the peripheral edge of the disk 1 from the rear side of the casing 3. Therefore, the disk 1 is loaded in the casing 3 while being supported by the three points in its peripheral edge.

When the first slider 13 travels forward from the position in FIG. 2 to the position in FIG. 3, the second slider 21 is almost stationary by engagement between the third cam 13c and the pin 21c. As shown in FIG. 3, the hold arm 19 energized by the disk 1 stops when the pin 19c enters the groove in the fourth cam 21b of the stationary second slider 21. The centering arm 23 is energized clockwise around the fulcrum pin 23a by tensile force of the extension spring 24. When the fifth cam 23c comes into contact with the pin 21d of the stationary second slider 21, the centering arm 23 stops in a state where the guide groove 23b is communicated with the guide groove 15a in the disk guide 15. When the third roller 25b comes into contact with the peripheral edge of the disk 1, the eject lever 25 stops against the tensile force of the extension spring 26. In this state, the pin 25c stops between the two contact walls of the cams 13f and 13g of the first slider 13.

When the disk 1 is released from press of the pull-in lever 16, as shown in FIG. 3, the disk 1 stops in a state where it is supported by the three members of the first and second rollers 16b and 19b and the guide groove 23b in the centering arm 23 just above the turntable 2 of the lifting portion 5. By the operation, the chuck 2a on the turntable 2 faces the holding hole 1a in the disk 1 and centering of the disk 1 is completed.

The first slider 13 moves forward also during centering of the disk 1, on completion of the centering, as shown in FIGS. 3 and 8C, the lifting portion 5 starts rising by engagement of the pins 8 and 9 of the lifting portion 5 and the sixth and seventh cams 13d and 21a of the first and second sliders 13 and 21, and chuck 2a of the turntable 2 fits in the holding hole 1a in the disk 1, thereby holding the disk 1. By relative travel of the pins 8 and 9 of the lifting portion 5 from the first cam groove "a" in the sixth and seventh cams 13d and 21a to the third cam groove "c" via the second cam groove "b", the lifting portion 5 rises to the highest position by using the two universal joints 6a and 6b as fulcrums, and the chuck 2a presses the disk 1 against the top face of the casing 3 and is fit in the holding hole 1a in the disk 1, thereby holding the disk 1.

The first slider 13 continues moving forward and, just before reaching the most advanced position shown in FIGS. 4 and 8D, the pins 8 and 9 of the lifting portion 5 travel relatively from the third cam groove "c" in the sixth and seventh cams 13d and 21a to the fifth cam groove "e" via the fourth cam groove "d". By the operation, the chuck 2a descends while holding the disk 1, and the disk 1 is detached from the top face of the casing 3.

When the first slider 13 reaches the most advanced position, the second switch C comes off from the ninth cam 13e and is turned off and the motor 11 stops.

When the pins 8 and 9 of the lifting portion 5 travel relatively from the fourth cam groove "d" in the sixth and seventh cams 13d and 21a to the fifth cam groove "e" just before the first slider 13 reaches the most advanced position shown in FIGS. 4 and 8D, as shown in FIG. 4, the coupling arm 17 and the pull-in lever 16 interlockingly move by engagement between the first and second cams 13b and 16c and the pins 17b and 17c, and the first roller 16b is slightly detached from the peripheral edge of the disk 1. Synchronously, the third cam 13c and the pin 21c engage with each other, the second slider 21 slides to the left, and the pin 19c enters the fourth cam 21b, thereby making the hold arm 19 swing counterclockwise around the fulcrum pin 19a. The second roller 19b is slightly detached from the peripheral edge of the disk 1. Simultaneously, the fifth cam 23c and the pin 21d engage each other, the centering arm 23 swings clockwise around the fulcrum pin 23a, and the guide groove 23b is slightly detached from the peripheral edge of the disk 1.

As shown in FIGS. 4 and 8E, when the first slider 13 stops in the most advanced position and the second switch C is turned off, the motor 11 rotates in reverse, thereby starting retry of the operation of holding the disk 1.

The motor 11 rotates reversely by turn-off of the second switch C, the first slider 13 moves backward from the holding operation end position in FIG. 8E to the intermediate position in FIG. 8F, and the chuck 2a is temporarily descended.

The first slider 13 moves back, the ninth cam 13e turns on the third switch B as shown in FIG. 3 so that the intermediate position is detected, and the chuck 2a stops in a position descended to a degree that the disk 1 held by the chuck 2a does not come into contact with the projection 29 by reverse stop of the motor 11.

Figure 8H:
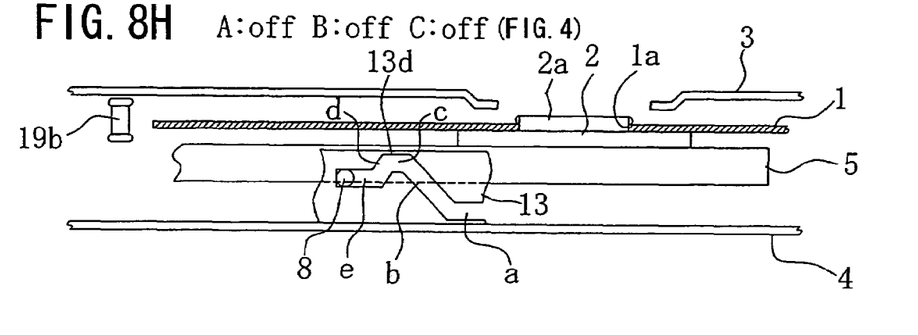
Figure 8I:
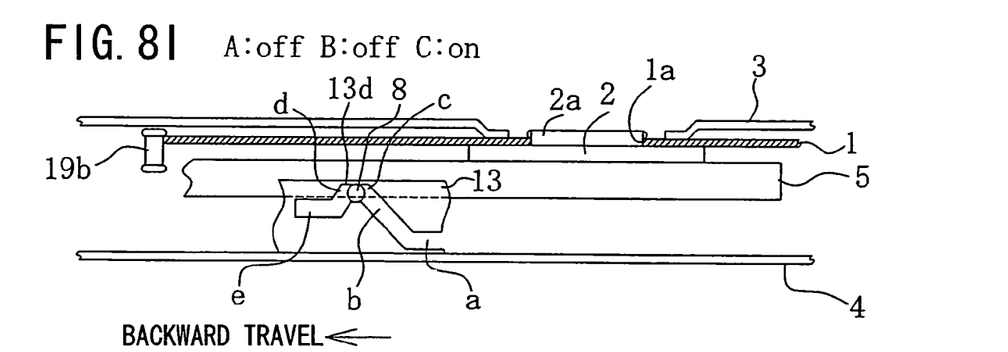
FIGS. 8I to 8L are longitudinal section views showing a disk ejection process and corresponding to a state before the disk is released, a state where the disk is being released, a disk release completion state, and a disk ejection completion state, respectively.
Figure 8J:
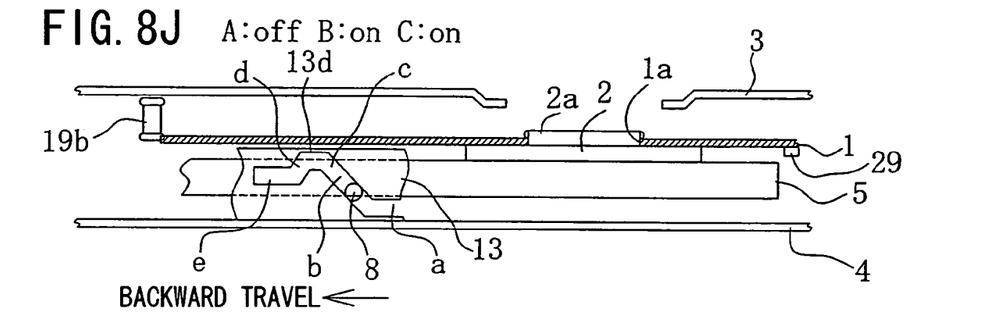
Figure 8K:
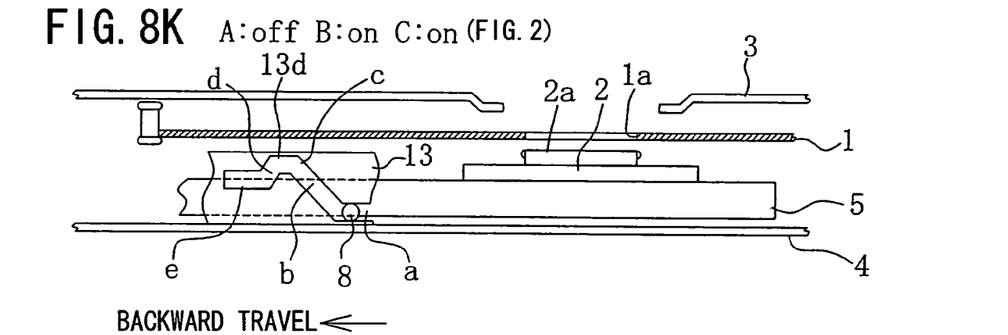
Figure 8L:
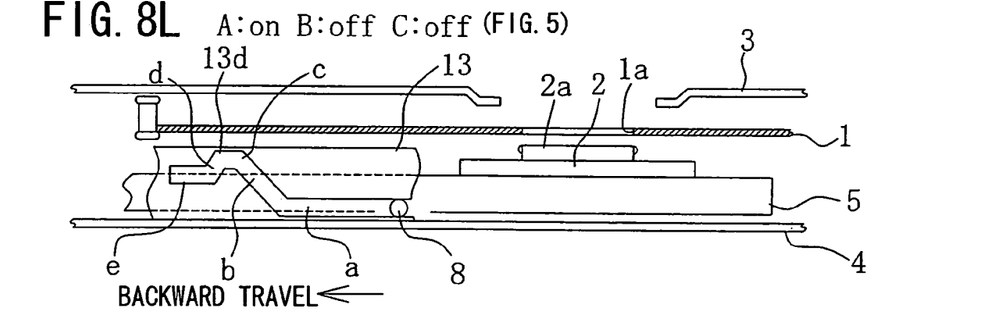

When the third switch B is turned on, the motor 11 is switched again to forward rotation and the first slider 13 moves forward as shown in FIG. 8G and reaches the holding operation end position in FIG. 8H. In this process, the chuck 2a rises again to the highest position. When holding of the disk 1 in the last holding operation is uncertain, the disk 1 is properly held.

When the first slider 13 reaches the holding operation end position in FIG. 8H, retry of the holding operation is finished. As shown in FIG. 4, the first, second, and third rollers 16b, 19b, and 25b are detached from the peripheral edge of the disk 1, the guide groove 23b of the centering arm 23 is detached, and the disk 1 is held only by the chuck 2a of the turntable 2.

In this case, the guide groove 23b, the first roller 16b, the second roller 19b, and the third roller 25b hold the disk 1 in the centering position until chucking of the disk 1 by the chuck 2a is completed. On completion of chucking, the second roller 19b and the guide groove 23b are detached from the disk 1 by the second slider 21, and the first and third rollers 16b and 25b are separated from the peripheral edge of the disk 1 by the first slider 13. Moreover, the first and second sliders 13 and 21 perform the centering canceling operation via the chucking completion state of the disk 1, thereby preventing the guide groove 23b, the first roller 16b, the second roller 19b, and the third roller 25b from being detached from the disk 1 before chucking. Thus, the disk 1 can be reliably centered.

After that, the turntable 2 is rotated by driving a not-shown turntable rotating motor, and the disk 1 held by the chuck 2a is rotated. A not-shown optical head of the lifting portion 5 scans the rotating disk 1, thereby recording/reproducing information to/from the disk 1.

Ejection of the disk 1 to the outside of the casing 3 is started when the eject switch 28 on the panel 3a is operated by the operator.

By operation of the eject switch 28, the motor 11 starts reverse rotation, and the first slider 13 starts moving backward from the position in FIG. 4.

By backward travel of the first slider 13, as shown in FIGS. 8I, 8J, 8K, and 8L, the pins 8 and 9 of the lifting portion 5 relatively slide from the fifth cam groove "e" into the first cam groove "a" in the order reverse to that of FIGS. 8A to 8D to descend the lifting portion 5 and release the disk 1 from the chuck 2a. As shown in FIG. 8J, when the lifting portion 5 descends, the disk 1 comes into contact with the ejection projection 29 and comes off from the chuck 2a. At the time of detaching the disk 1 from the chuck 2a, the guide groove 23b, the first roller 16b, the second roller 19b, and the third roller 25b come into contact with the peripheral edge of the disk 1 to hold the disk 1.

When the disk 1 is released from the chuck 2a during backward travel of the first slider 13, as shown in FIG. 5, the contact wall of the cam 13f on the front side of the first slider 13 comes into contact with the pin 25c of the eject lever 25, the eject lever 25 swings counterclockwise by using the fulcrum pin 25a as a fulcrum, and the disk 1 is pushed to the front of the casing 3 by the third roller 25b.

The second slide 21 slides to the right by engagement between the third cam 13c and the pin 21c, the pin 19c is released from the fourth cam 21b, and the hold arm 19 is unlocked. The hold arm 19 is pulled by the extension spring 20 and returns to a standby position together with the second roller 19b.

As the second slider 21 slides to the right, the centering arm 23 swings counterclockwise around the fulcrum pin 23a as a center by engagement between the fifth cam 23c and the pin 21d, there by making the guide groove 23b communicate with the guide groove 15a in the disk guide 15.

Further, by engagement between the first cam 13b and the pin 17b, the pull-in lever 16 swings in association with swing of the eject lever 25, and the first roller 16b moves along the peripheral edge of the disk 1.

Consequently, the disk 1 is guided by the guide groove 23b in the centering arm 23, the guide groove 15a in the disk guide 15, and the first roller 16b while being pushed by the third roller 25b of the eject lever 25 and is ejected to the outside of the casing 3 as shown in FIG. 5.

As shown in FIG. 5, after ejecting the disk 1, the switch arm 27 which operates interlockingly with the eject lever 25 turns on the switch A. After that, when the ninth cam 13e in the first slider 13 turns off both of the switches C and B, reverse rotation of the motor 11 stops, and the first slider 13 stops in the most backward position.

The motor 11 starts forward rotation again to make the first slider 13 travel forward and stops after the ninth cam 13e turns on both of the second switch C and the third switch B as shown in FIG. 1. Herewith, the disk carrying apparatus returns to the initial standby position and waits for next insertion of the disk 1.

As described above, according to the preferred embodiment of the present invention, in a disk carrying apparatus which loads the disk 1 onto the turntable 2 and holds the disk 1 by the chuck 2a as a holding portion of the turntable 2 by the holding operation of making the disk 1 and the turntable 2 placed close to each other, by setting an intermediate position between the holding operation start position of holding the disk 1 and the holding operation end position, the holding operation is retried between the holding operation end point and the intermediate point. Consequently, by appropriately adjusting the intermediate point, the holding operation of holding the disk 1 can be properly performed.

According to the present invention, by disposing a plurality of switches for detecting an intermediate point, the retry operations can be performed a plurality of times, and the disk carrying apparatus can be controlled more finely.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2000-360056 filed on Oct. 20, 2003 including the specification, claims, drawings and summary is incorporated herein by reference in its entirety.

What is claimed is:

1. A disk carrying apparatus comprising a disk carrying mechanism which carries a disk onto a turntable,
   a disk holding mechanism which includes a chuck having the carried disk rotatably fitted therein and which holds the carried disk on the turntable, and
   an intermediate position detector which detects an intermediate position between a holding operation start position where said chuck starts a disk holding operation and a holding operation end position where said chuck finishes the disk holding operation,
   wherein after completion of an initial disk holding operation, said chuck returns to the intermediate position detected by said intermediate position detector and retries the disk holding operation.

2. The disk carrying apparatus according to claim 1, wherein said disk holding mechanism has a releasing mechanism which performs a releasing operation of releasing the disk held on the turntable, the releasing operation is performed between the holding operation start position and the holding operation end position of the disk holding operation, and wherein said intermediate position is set between the holding operation end position of the disk holding operation by said disk holding mechanism and a releasing operation start position of the releasing operation.

3. The disk carrying apparatus according to claim 1, further comprising a holding operation end position detector which detects the holding operation end position of the disk holding operation, wherein said intermediate position detector is disposed so as to be adjacent to said holding operation end position detector.

4. The disk carrying apparatus according to claim 2, further comprising a holding operation end position detector which detects the holding operation end position of the disk holding operation, wherein said intermediate position detector is disposed so as to be adjacent to said holding operation end position detector.

5. The disk carrying apparatus according to claim 3, wherein said intermediate position detector and said holding operation end position detector detect the intermediate position and the holding operation end position respectively by using a displacing member which displaces together with the disk holding operation of said disk holding mechanism.

6. The disk carrying apparatus according to claim 4, wherein said intermediate position detector and said holding operation end position detector detect the intermediate position and the holding operation end position respectively by using a displacing member which displaces together with the disk holding operation of said disk holding mechanism.

7. The disk carrying apparatus according to claim 5, further comprising a driving mechanism which drives said disk carrying mechanism and said disk holding mechanism, wherein
   said driving mechanism comprises said displacing member.

8. The disk carrying apparatus according to claim 6, further comprising a driving mechanism which drives said disk carrying mechanism and said disk holding mechanism, wherein
said driving mechanism comprises said displacing member.

* * * * *